United States Patent
Idrizovic et al.

(10) Patent No.: US 8,424,172 B2
(45) Date of Patent: Apr. 23, 2013

(54) MALE TOUCH FASTENER ELEMENT

(75) Inventors: Almin Idrizovic, Manchester, NH (US); Christopher M. Gallant, Nottingham, NH (US); William D. Grenier, Manchester, NH (US)

(73) Assignee: Velcro Industries B.V., Willemstad, Curacao ( * ) Notice: Subject to any disclaimer, the term of this patent is extended or adjusted under 35 U.S.C. 154(b) by 198 days.

(21) Appl. No.: 13/094,466

(22) Filed: Apr. 26, 2011

(65) Prior Publication Data

US 2011/0265293 A1 Nov. 3, 2011

Related U.S. Application Data

(60) Provisional application No. 61/328,257, filed on Apr. 27, 2010.

(51) Int. Cl.
*A44B 18/00* (2006.01)

(52) U.S. Cl.
USPC ............................................................ 24/452

(58) Field of Classification Search ............ 24/442, 24/449, 450, 452; 604/391; 428/99, 100
See application file for complete search history.

(56) References Cited

U.S. PATENT DOCUMENTS

| | | |
|---|---|---|
| 4,984,339 A | 1/1991 | Provost et al. |
| 5,339,499 A | 8/1994 | Kennedy et al. |
| 5,392,498 A | 2/1995 | Goulait et al. |
| 5,515,583 A | 5/1996 | Higashinaka |
| 5,518,795 A | 5/1996 | Kennedy et al. |
| 5,551,130 A | 9/1996 | Tominaga et al. |
| 5,636,414 A | 6/1997 | Litchholt |
| 5,685,050 A | 11/1997 | Murasaki |
| 5,755,016 A | 5/1998 | Provost |
| 6,131,251 A | 10/2000 | Provost |
| 6,248,419 B1 | 6/2001 | Kennedy et al. |
| 6,357,088 B2 | 3/2002 | Provost et al. |
| 6,694,576 B1 | 2/2004 | Fujisawa et al. |
| 6,737,147 B2 | 5/2004 | Kennedy et al. |
| 7,162,780 B2 | 1/2007 | Martin et al. |
| 7,185,401 B2 | 3/2007 | Ausen et al. |
| 7,516,524 B2 | 4/2009 | Provost et al. |
| 7,520,033 B2 | 4/2009 | Clarner |
| 7,527,848 B2 | 5/2009 | Baldauf |
| 7,621,026 B2 | 11/2009 | Lindsay et al. |
| 2002/0022108 A1 | 2/2002 | Krantz et al. |
| 2002/0037390 A1 | 3/2002 | Shepard et al. |
| 2002/0053119 A1 | 5/2002 | Provost et al. |
| 2002/0056177 A1 | 5/2002 | Takizawa et al. |
| 2002/0125605 A1 | 9/2002 | Lacey et al. |
| 2002/0162197 A1 | 11/2002 | Romanko et al. |

(Continued)

FOREIGN PATENT DOCUMENTS

WO W09413168 A1 6/1994

*Primary Examiner* — James Brittain
(74) *Attorney, Agent, or Firm* — Fish & Richardson P.C.

(57) ABSTRACT

A touch fastener has a base and an array of discrete fastener elements each extending from the base and together forming with the base a contiguous mass of resin. Each discrete fastener element includes a stem rising from the base, and a head overhanging the base from a front side of the stem to a distal edge, the front side of the stem, an underside of the head, and an upper surface of the base together forming, in side profile, a generally curved retention space boundary surface such that the boundary surface forms, at its innermost extent, a retention cavity defined between curvature discontinuities spaced from both the base and the distal edge.

20 Claims, 5 Drawing Sheets

U.S. PATENT DOCUMENTS

| | | |
|---|---|---|
| 2003/0161991 A1 | 8/2003 | Henderson |
| 2004/0076793 A1 | 4/2004 | Clune et al. |
| 2004/0088835 A1 | 5/2004 | Tachauer et al. |
| 2004/0194262 A1 | 10/2004 | Kurtz et al. |
| 2005/0081344 A1 | 4/2005 | Clarner |
| 2005/0081345 A1 | 4/2005 | Tolan et al. |
| 2006/0048347 A1 | 3/2006 | Kurtz et al. |
| 2006/0154019 A1 | 7/2006 | Cheng |
| 2006/0200952 A1 | 9/2006 | Clarner |
| 2006/0210762 A1 | 9/2006 | Tachauer |
| 2006/0216461 A1 | 9/2006 | Tachauer et al. |
| 2007/0110952 A1 | 5/2007 | Clarner et al. |
| 2009/0035509 A1 | 2/2009 | Kurtz |

MALE TOUCH FASTENER ELEMENT

CROSS-REFERENCE TO RELATED APPLICATIONS

This application claims the benefit of U.S. Provisional Application No. 61/328,257, filed on Apr. 27, 2010, which is incorporated by reference herein.

TECHNICAL FIELD

This invention relates to male touch fastener elements configured to releasably engage fibrous loops, and more particularly to such fastener elements with stems formed of molded resin.

BACKGROUND

Early male touch fastener products were generally woven materials, with hooks formed by cut filament loops. More recently, arrays of very small touch fastener elements have been formed by molding the fastener elements, or at least the stems of the elements, of resin forming an interconnecting sheet of material. Typically a series of adjacent rows of male fastener components forms one side or element of a fastener closure and a mating female fastener component provides a field of loops or anchored fibers with which the male fasteners engage.

In most applications, male fastener elements are designed to releasably engage with the mating female fastener component. To engage the loops, the male fastener elements must penetrate the field of fibers at least until the tips of the engaging fastener element heads have sufficiently extended beyond some of the fibers, such that the fibers can be engaged within the crooks of the heads.

Subsequent to engagement, retention of an engaged fiber or loop depends, at least for loads within the ability of the loop to resist breakage, upon the head's resistance to distention and/or breakage. Distention is the opening of the crook under load of an engaged loop. For high cycle life applications, breakage of loops and heads is undesirable. Thus, the ability of the fastening to resist peel loads in such applications is generally limited by the ability of the head to resist distention.

Unfortunately, for many applications increasing the rigidity of heads designed for maximum loop penetration, to increase their peel resistance, is either undesirable or impractical. For example, many applications require a gentle 'feel' of the male fastener element array against the skin.

Further improvements in the overall design of male fastener elements, particularly those formed or molded of resin and arranged in large numbers upon a surface for engaging loops or fibers, are desired. Preferably, such improved fastener elements will be readily and efficiently manufacturable without great advances in manufacturing methods.

SUMMARY

In general, various innovative aspects of the subject matter described in this specification feature a touch fastener that includes a base and an array of discrete fastener elements each extending from the base and together forming with the base a contiguous mass of resin, in combination with one or more of the innovative aspects described below.

For example, one innovative aspect features a discrete fastener element including a stem rising from the base, and a head overhanging the base from a front side of the stem to a distal edge, the front side of the stem, an underside of the head, and an upper surface of the base together forming, in side profile, a generally curved retention space boundary surface such that the boundary surface forms, at its innermost extent, a retention cavity defined between curvature discontinuities spaced from both the base and the distal edge.

In various implementations, the fastener elements can each optionally include one or more of the following features. At least one of the curvature discontinuities can be an inflection point along the boundary surface or a corner. The retention cavity can be bounded by a concave cavity wall. The concave cavity wall can define a constant or variable curvature radius. For example, the curvature radius can be less than 20 percent of an overall height of the fastener element above the upper surface of the base and/or can be between about 0.001 and 0.003 inch (0.025 and 0.076 mm). The head of each fastener can be a generally flat, circular head having a circumference defined by the distal edge.

Another innovative aspect features a discrete fastener element including a stem rising from the base, and a head overhanging the base from a front side of the stem to a distal edge, the front side of the stem, an underside of the head and an upper surface of the base together forming, in side profile, retention space boundary surface such that each fastener element has a ratio of peel thickness, measured along a line 45 degrees to the upper surface of the base and normal to the boundary surface at a point of intersection with the boundary surface, to an elevation of the point of intersection measured from the upper surface of the base, that is greater than 0.75 (in some examples, greater than 0.85).

In some cases, the elevation of the point of intersection is about half of the overall height of the fastener element above the upper surface of the base.

Another innovative aspect features a discrete fastener element including a stem rising from the base, and a head overhanging the base, the stem, underside of the head, and an upper surface of the base together forming a retention space boundary surface having a region of innermost extent such that the region of innermost extent is spaced above the upper surface of the base, and such that the stem has a thickness, measured parallel to the base at the region of innermost extent in a vertical plane intersecting the boundary surface, that is at least twice an elevation of the region of innermost extent above the upper surface of the base.

Yet another innovative aspect features a discrete fastener element including a stem rising from the base, and a head overhanging the base and having a distal tip directed along the row of the fastener element, the stem, an underside of the head, and an upper surface of the base together forming a retention space boundary surface having a region of innermost extent such that the region of innermost extent is spaced above the upper surface of the base and such that the stem has a thickness, measured parallel to the base at the region of innermost extent, that is at least 1.7 times an elevation of the region of innermost extent above the upper surface of the base.

In some examples, the boundary surface forms, at its innermost extent, a retention cavity defined between curvature discontinuities spaced from both the base and the distal edge.

In some cases, the elevation of the point of intersection is about half of the overall height of the fastener element above the upper surface of the base.

The head of each fastener, for some applications, is a generally flat, circular head having a circumference defined by the distal edge.

The various inventive aspects described above can be combined for particular advantage in different embodiments. Additionally, embodiments may be provided with other features. For example, the fastener elements can have at least one flat side. The distal edge of each of the fastener elements can be a distal tip, such as a non-reentrant tip (i.e., one that extends generally parallel to or away from the base). Each fastener can include two or more distinct, distal tips. The boundary surface can be generally curved. The innermost extent of the boundary surface or the region of innermost extent can be disposed at an elevation above the upper surface of the base that is less than half of an overall height of the fastener element above the upper surface of the base. An innermost extent of the boundary surface and/or the retention cavity and a forward-most portion of the distal edge/tip can form a line extending at between about 20 and 40 degrees to the base, and preferably 30 degrees to the base.

Some aspects of the invention feature a retention cavity or pocket formed by a generally curved boundary surface on a front side of the stem. In general, it is realized that the curved boundary surface effectively gathers fibers or loops with which the fastener element is engaged, directing them into the pocket. In this way, retention of the engaged fiber or loop, and the corresponding peel resistance of the fastener component, may be improved.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
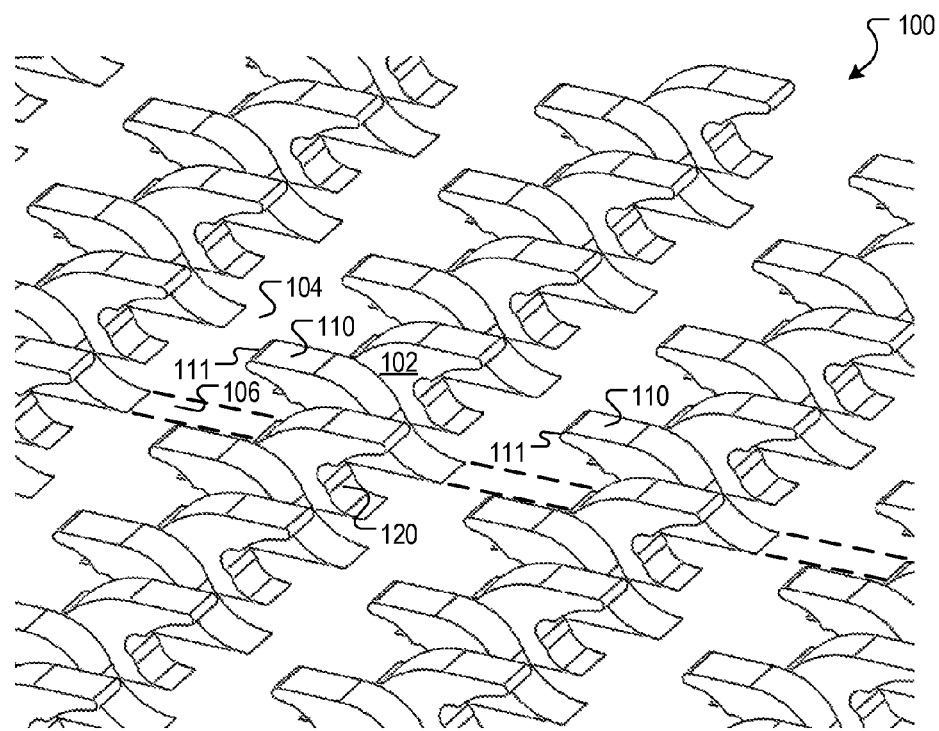
FIGS. 1A and 1B are perspective and top views, respectively, of an array of discrete fastener elements.
Figure 1B:
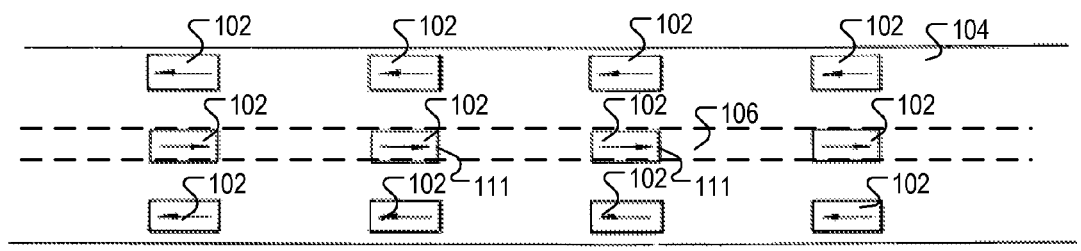

Referring to FIGS. 1A and 1B, a male touch fastener component 100 includes an array of discrete fastener elements 102 arranged in rows 106 extending outwardly from a sheet-form base 104, and together forming with base 104 a contiguous mass of resin. Each fastener element 102 includes a head 110 having a non-reentrant tip 111 and extending from a stem 120. A non-reentrant tip, as used herein, generally refers to a tip that extends away from stem 120, substantially parallel to or away from an upper surface 105 of base 104. Fastener elements 102 are engageable in two directions along a plane (i.e., an engagement plane) perpendicular to sheet-form base 108 in the direction of rows 110.

Male fastener component 100 is designed to, for example, strongly engage a low pile height, loop touch fastener component, particularly a loop component with loops formed of inexpensive knit or nonwoven materials. Inexpensive knit or nonwoven materials are desirable for fasteners for mass-produced, disposable products such as infant care products, personal care and medical products and packaging requiring low cycle life. Nonwoven loop materials are constructed, for instance, of a layer of fibers or filaments that have relatively raised or lofty loop regions between regions secured by adhesives or self-adhesive bonds. There is particular need in these cases for the hook component to be low-cost while having dependable fastening properties.

Figure 2A:
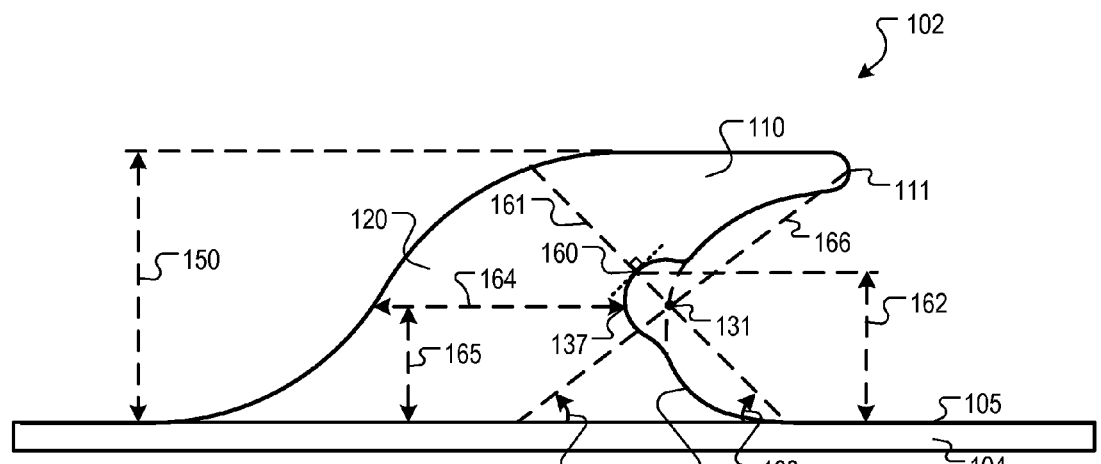
FIGS. 2A, 2B and 2C are side and front views of a discrete fastener element.
Figure 2B:
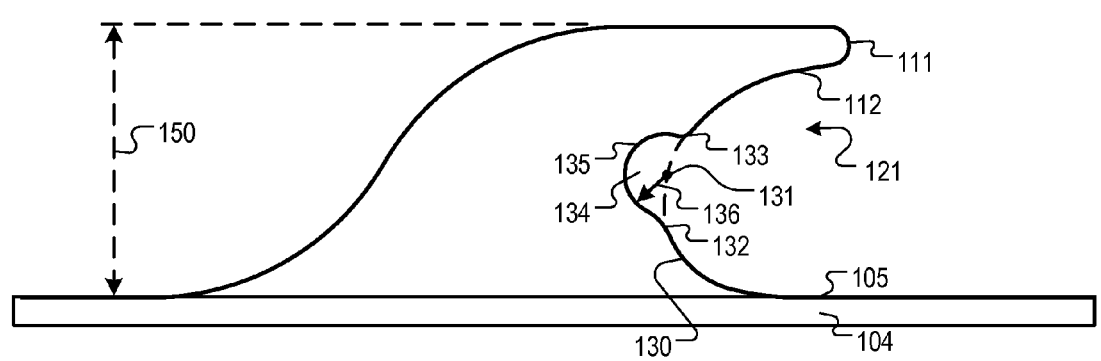
Figure 2C:
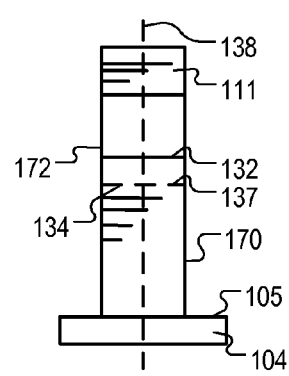

Referring now to FIGS. 2A, 2B, and 2C, fastener element 102 has a substantially constant thickness from base to tip, and includes a stem 120 rising from a base 104, and a head 110 overhanging the base from a front side 121 of stem 120 to a distal edge, i.e. tip 111. A generally curved retention space boundary surface 130 is formed, in side profile, by front side 121 of stem 120, an underside 112 of head 110, and an upper surface 105 of base 104. Boundary surface 130 forms, at its innermost extent 131, a retention cavity 134 defined between curvature discontinuities 132, 133 spaced from both base 104 and distal tip 111.

Figure 3:
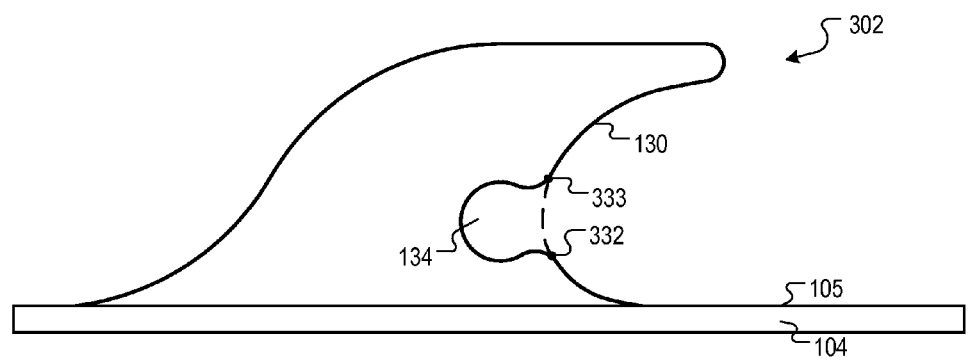
FIGS. 3 and 4 are side views of alternative implementations of a discrete fastener element.
Figure 4:
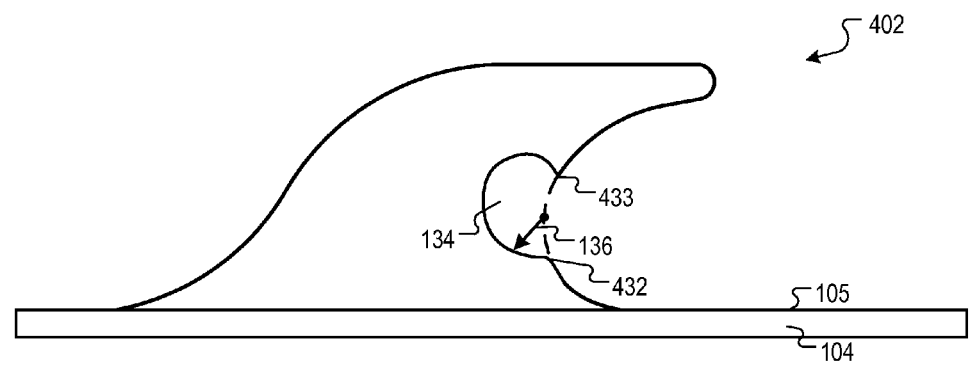

In various implementations, curvature discontinuities 132, 133 are of a single type. For example, FIG. 3 illustrates an alternative implementation of a fastener element 302 in which the curvature discontinuities include inflection points 332, 333 at which boundary surface 130 changes from being concave upwards (i.e., positive curvature) to concave downwards (i.e., negative curvature), and vice versa. In contrast, FIG. 4 illustrates an implementation of a fastener element 402 in which the curvature discontinuities are different and include a sharp corner 433 and rounded corner 432. As illustrated in FIGS. 3 and 4, some implementations include a deeper and/or lower retention cavity 134. These and other characteristics vary between implementations to achieve varying degrees of performance with respect to peel resistance and/or to mitigate loop breakage.

Referring again to FIG. 2B, retention cavity 134 is bound by a concave cavity wall 135. In some implementations, concave cavity wall 135 defines a constant curvature radius 136. In particular, some examples include a constant curvature radius 136 of less than 20 percent of an overall height 150 of fastener element 102 above upper surface 105 of base 104. In other examples, curvature radius 136 varies (i.e., the distance as measured in side profile from inner most extent 131 of boundary surface 130 to concave cavity wall 135). For example, as illustrated in FIG. 4, a variable curvature radius 136, as measured in side profile, increases from corner 432 to corner 433. In each of the examples, the curvature radius is preferably between about 0.001 and 0.003 inch.

In particular implementations, the height, depth, and size of retention cavity 134 and overall dimensions of fastener element 102 are molded to achieve a desired peel thickness, stem thickness, and/or to achieve a desired ratio of these parameters to the overall dimensions of the fastener element.

Peel thickness, as used herein, is defined as the thickness of fastener element 102 as measured in side profile along a line 45 degrees to the upper surface of the base and extending from the front side of the stem to the back of the head, such that the line is normal to the front side of the stem at a point of intersection. For example, in FIG. 2A, line 161 forms a 45 degree angle 163 to upper surface 105 of base 104 and extends from front side 121 of stem 120 to the back of head 110 such that line 161 is normal to the front side of stem 120 at a point of intersection 160. The point of intersection in FIG. 2A is within retention cavity 134. In some implementations without a retention cavity, the point of intersection occurs at a point along boundary surface 130.

In some embodiments, each fastener element 102 has a ratio of peel thickness to an elevation 162 of point of intersection 160 (measured from upper surface 105 of base 104)

that is greater than 0.75, and preferably greater than 0.85. Further, in some examples, innermost extent 131 of boundary surface 130 is disposed at an elevation 165 above upper surface 105 of base 104 such that elevation 165 is less than half of the overall height 150 of fastener element 102 above the upper surface of the base. Still further, in some embodiments, head 110 is molded such that innermost extent 131 of boundary surface 130 and a forward-most portion of distal tip 111 form a line 166 extending at an angle 167 having a value of between about 20 and 40 degrees to base 104, and preferably 30 degrees.

In various implementations, fastener element 102 includes a stem thickness 164, measured parallel to base 104 at a region of innermost extent 137 in a vertical plane 138 intersecting boundary surface 130, that is at least twice an elevation 165 of the region of innermost extent above the upper surface of the base. In some implementations having distal tip 111 directed along the row 106 of fastener element 102, stem 120 has a thickness 164 that is at least 1.7 times an elevation 165 of the region of innermost extent above the upper surface of the base.

Figures 5A, 5B:
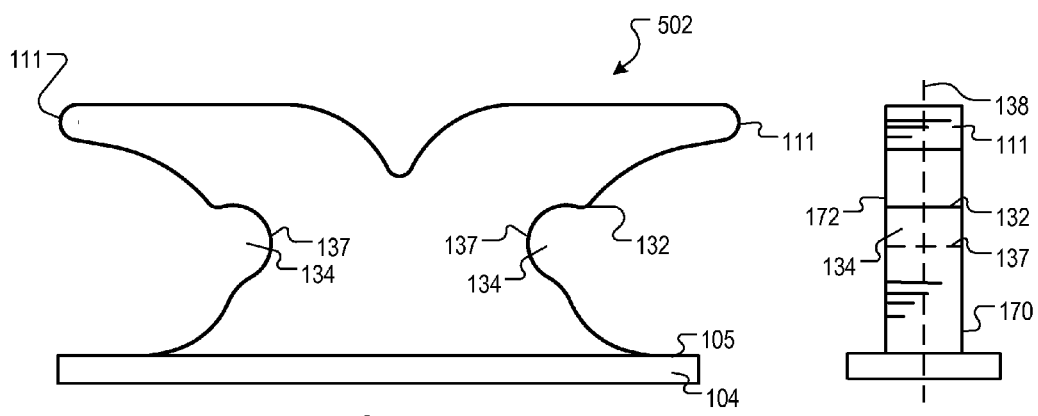
FIGS. 5A and 5B are side and front views, respectively, of an exemplar palm tree implementation.
Figure 6:
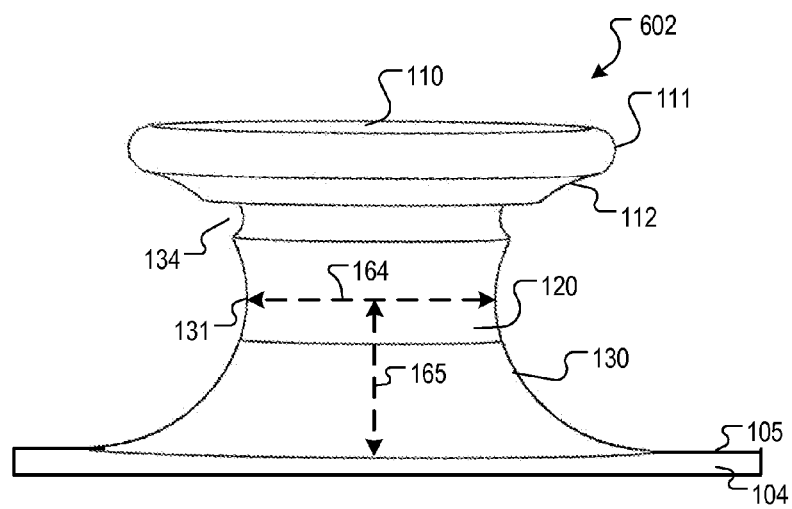
FIG. 6 is a perspective view of an exemplar mushroom implementation.
Figures 7A, 7B:
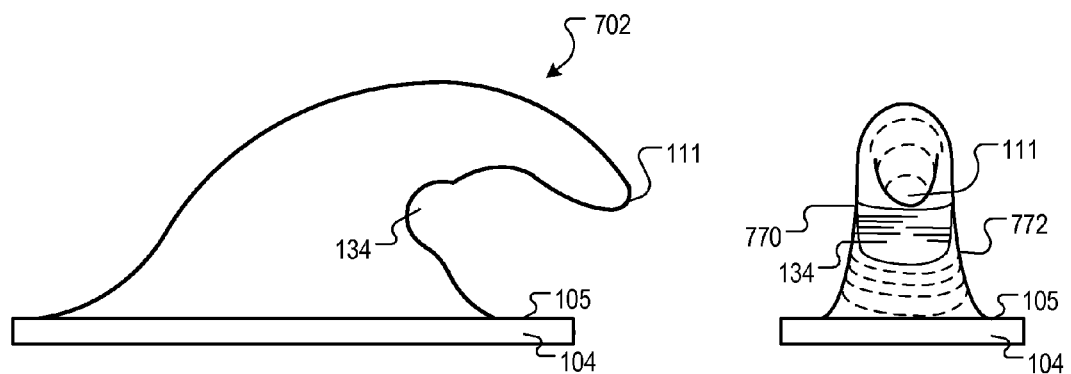
FIGS. 7A and 7B are side and front views, respectively, of an exemplar J-hook implementation.

For some applications, the innovative aspects described herein are combined with other fastener shapes, such as 'palm-trees', mushrooms, and J-hooks. For example, FIGS. 5A and 5B illustrate a 'palm-tree' fastener 502 including two distal tips 111 and two retention cavities 134 spaced away from distal tips 111 and base 104. FIG. 6 illustrates a mushroom type fastener 602 including a flat, circular head 110 having a circumference defined by a concave distal edge 111. In various implementations, including that of FIG. 6, mushroom fastener 602 includes a continuous retention cavity 134 formed around the perimeter of stem 120 and spaced away from distal edge 111 and upper surface 105 of base 104. FIGS. 7A and 7B illustrate a J-hook fastener 702 including a tapered, re-entrant tip 111, a retention cavity 134, and generally curved sides 770, 772.

Referring again to FIG. 6, a mushroom type fastener element 602 includes a stem 120 extending from a base 104, and a head 110 overhanging base 104, stem 120, an underside 112 of head 110, and an upper surface 105 of base 104 together forming a retention space boundary surface 130 having a region of innermost extent 131 such that the region of innermost extent 131 is spaced above upper surface 105 of base 104, and such that stem 120 has a thickness 164, measured parallel to base 104 at the region of innermost extent 131. In some implementations, thickness 164 is at least twice an elevation 165 of the region of innermost extent 131 above upper surface 105 of base 104.

Figure 8:
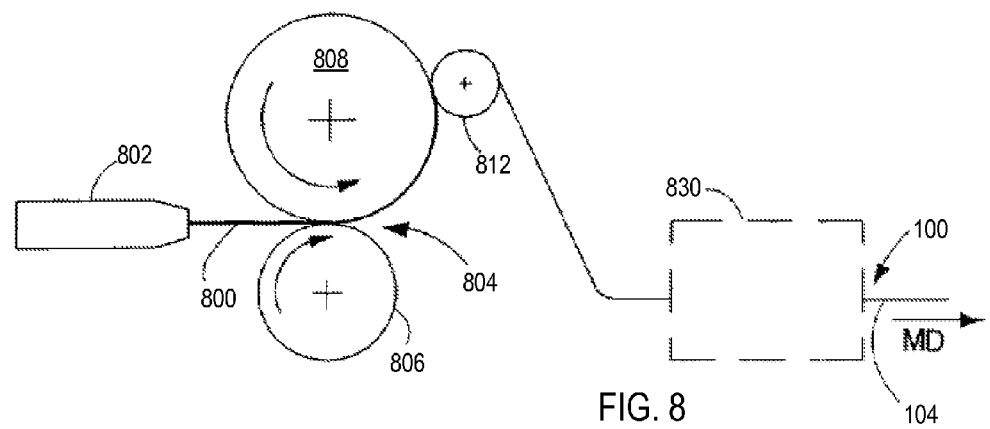
FIGS. 8, 9 and 10 are schematic views of systems for forming hook members using a mold roll.

Each of fastener elements of FIGS. 1A-7B can be molded into the shapes shown using one or more techniques. For example, FIG. 8 illustrates a molding technique in which thermoplastic resin 800 is extruded as a molten sheet from extruder 802 and introduced into nip 804 formed between a pressure roll 806 and a counter-rotating mold roll 808 defining fastener element-shaped cavities in its surface. Pressure in the nip causes thermoplastic resin 800 to enter blind-ended forming cavities to form the fastener elements, while excess resin remains about the periphery of the mold roll and is molded between the rolls to form sheet-form base 104. The thermoplastic resin is cooled as it proceeds along the periphery of the mold roll, solidifying the fastener elements, until it is stripped by stripper roll 812. The molded fastener elements distend during de-molding, but tend to recover substantially their as-molded shape. It is generally understood that fastener element crooks molded to face downstream tend to distend slightly more than those molded to face upstream, and can remain more distended in the final product. The direction of travel of the material illustrated in FIG. 8 is referred to as the "machine direction" (MD) of the material and defines the longitudinal direction of the resulting product, while the cross-machine direction (CD) is perpendicular to the machine direction within the plane of the sheet-form base. Further details regarding processing are described by Fischer, U.S. Pat. No. 4,775,310 and Clune et al., U.S. Pat. No. 6,802,260, the disclosures of which are hereby incorporated in full by reference.

In some embodiments, the mold roll 808 comprises a face-to-face assembly of thin, circular plates or rings (not shown) that are, for example, about 0.003 inch to about 0.250 inch (0.0762 mm-6.35 mm) thick, some having cutouts in their periphery defining mold cavities and others having solid circumferences, serving to close the open sides of the mold cavities and serve as spacers, defining the spacing between adjacent fastener element rows. A fully "built up" mold roll may have a width, for example, from about 0.75 inch to about 6 inches (1.91 cm-15.24 cm) or more and may contain, for example, from about 50 to 1000 or more individual rings. Further details regarding mold tooling are described by Fisher, U.S. Pat. No. 4,775,310. Additional tooling embodiments will also be described below.

The cavities that made the fastener element shown in FIG. 1A-5B have sharp edges and straight sidewalls (e.g., see sidewalls 170, 172 shown in FIGS. 2C and 5B) and create fastener elements with substantially similar cross-sections through the thickness of the fastener element. Tooling with straight sidewalls and edges can be made by, for example, laser cutting, wire EDM or electroforming. Further details regarding laser cutting and wire EDM mold tooling is described by Fisher, U.S. Pat. No. 4,775,310. The electroforming process is described by Clarner et al., U.S. Pat. No. 7,052,638, the disclosure of which is hereby incorporated in full by reference.

By contrast, fastener elements formed in cavities that have been, for example, photochemically etched may have rounded surfaces in some or all regions, from base to tip, such as the fasteners illustrated in FIGS. 6-7B. For example, surfaces at the top of the heads can be made to taper to a point to give a wedge effect. A wedge-shape may, for example, assist the entry of the crook into the face of a mating female fastener component. Further details regarding photochemical etching is described in Lacey et al., U.S. Pat. No. 6,163,939, the entire disclosure of which is hereby incorporated in full by reference.

Figure 9:
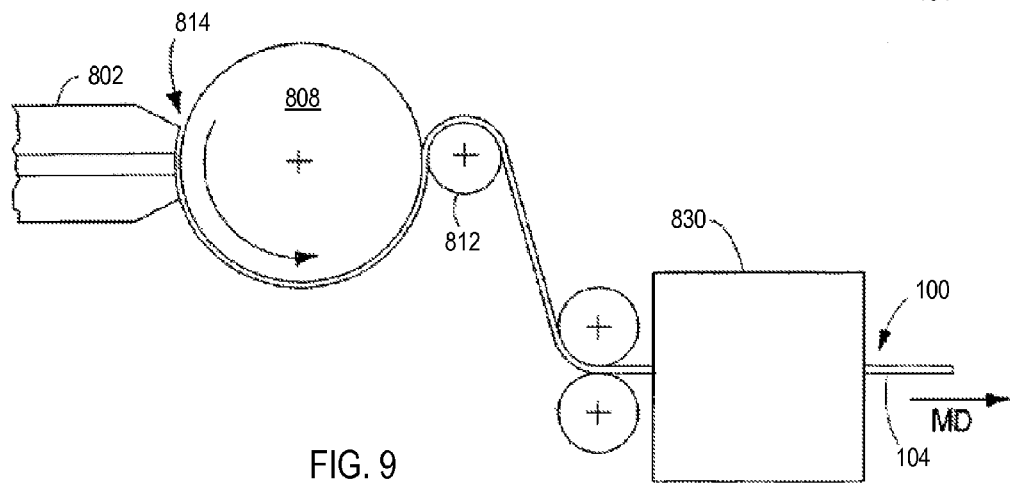

An alternate technique for molding fastener elements is shown in FIG. 9. The process is similar to that described above with reference to FIG. 8, except only a mold roll 808 is used, i.e., no pressure roll 806 is necessary. Here, the extruder 802 is shaped to conform to the periphery of the mold roll 808 and the extruded resin 800 is introduced under pressure directly to a gap 814 formed between mold roll 808 and extruder 802. The molded fastener component is stripped from the mold cavities by a stripper roll 812 as described above. Further details regarding this process are described by Akeno, U.S. Pat. Nos. 5,781,969 and 5,913,482, the disclosures of which are hereby incorporated in full by reference.

Figure 10:
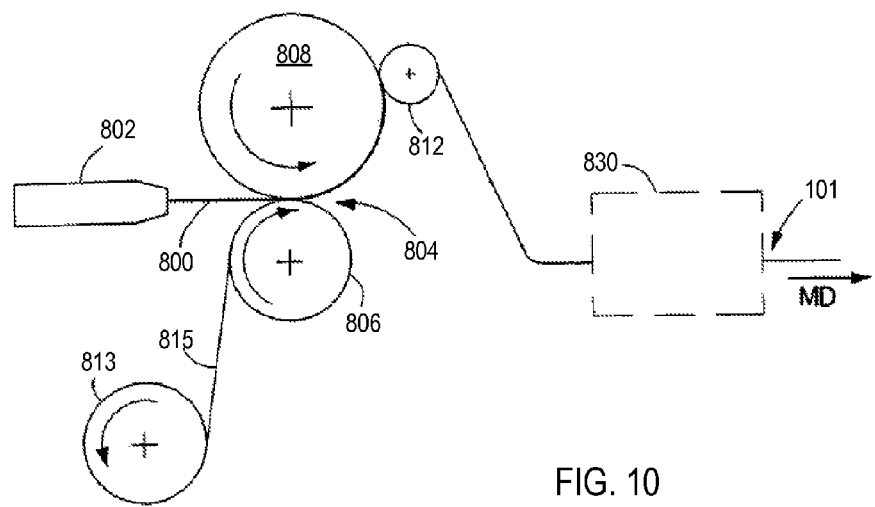

Referring to FIG. 10, a laminated male touch fastener component 101 may be formed by introducing a pre-form material 815 into nip 804 between the mold and pressure rolls. As a result of the heat and pressure in nip 804, pre-form material 815 becomes laminated and bonded to the thermoplastic resin 800 simultaneously with the forming of the fastener elements. The result can be a contiguous molded structure, without weld lines, extending from the tips of the fastener elements into the pre-form material, where the resin can intimately bond with features or fibers of the material to form a strong, permanent bond. Further details regarding this process are described by Kennedy et al., U.S. Pat. Nos. 5,260, 015, the disclosures of which is hereby incorporated in full by reference.

In one useful embodiment, pre-formed material 815 is a loose knit scrim, such as Knit 3901 from Velcro USA in Manchester, N.H., although Velcro USA loop products 3900, 3905, and 3400 may also be employed. These fabrics are 2 bar tricot knit fabrics, whose technical back sides are typically brushed or napped to raise the surface floats and create a hook-engageable loop surface. Knit 3901 is a similar 2 bar Tricot knit nylon fabric which generally must be brushed or napped before it can be employed as the functioning loop of a hook and loop closure. However, it has been found to function well as a reinforcement when at least partially encapsulated by, or bonded to, the base resin contiguous with the resin forming the hooks, without brushing or napping. Reinforcing the base with such a scrim has been found to improve the stitch tear strength of the product, providing a resin-base hook product practical for attachment by sewing or stitching.

Referring back to FIGS. 8-10, in some cases, the fastener elements are not molded in their final form. In any of the methods disclosed above, for example, the fastener component may be routed through subsequent processing station 830 to finalize the form of the fastener elements. Such subsequent processing may include "flat-topping" overhanging fastener element preforms, as described by Provost, U.S. Pat. No. 5,953,797, and Akeno, U.S. Pat. No. 5,781,969, the disclosure of both of which is hereby incorporated in full by reference. In some cases, even straight molded stems may be subsequently processed to result in fastener elements having the properties disclosed herein. Flat-sided fastener elements with the profiles shown in FIGS. 2C and 5B can also be formed by a cut-and-stretch method, such as the method disclosed in Nestegard, U.S. Pat. No. 4,895,569, for example. In such processes, moldable resin is extruded through a die with openings shaped in the desired hook profile, then the extruded rails are cut transverse to the extrusion direction, and the base stretched in the extrusion direction to separate the rails into rows of discrete fastener elements. This procedure results in fastener elements with broad sides that are cut rather than molded, as in the processes described above, and with profile edges formed by sliding resin through a shaped die rather than a filling cavity.

A number of embodiments of the invention have been described. Nevertheless, it will be understood that various modifications may be made without departing from the spirit and scope of the invention. Accordingly, other embodiments are within the scope of the following claims.

What is claimed is:

1. A touch fastener comprising:
    a base; and
    an array of discrete fastener elements each extending from the base and together forming with the base a contiguous mass of resin;
    wherein each of the fastener elements comprises:
        a stem rising from the base; and
        a head overhanging the base from a front side of the stem to a distal edge, the front side of the stem, an underside of the head, and an upper surface of the base together forming, in side profile, a generally curved retention space boundary surface;
        wherein the boundary surface forms, at its innermost extent, a retention cavity defined between curvature discontinuities spaced from both the base and the distal edge.

2. The touch fastener of claim 1, wherein at least one of the curvature discontinuities is an inflection point along the boundary surface.

3. The touch fastener of claim 1, wherein at least one of the curvature discontinuities is a corner.

4. The touch fastener of claim 1, wherein the retention cavity is bounded by a concave cavity wall.

5. The touch fastener of claim 4, wherein the concave cavity wall defines a constant curvature radius.

6. The touch fastener of claim 1, wherein each of the fastener elements has at least one flat side.

7. The touch fastener of claim 1, wherein each of the fastener elements comprises two distal tips.

8. The touch fastener of claim 1, wherein the head is a generally flat, circular head having a circumference defined by the distal edge.

9. The touch fastener of claim 1, wherein the innermost extent of the boundary surface is disposed at an elevation above the upper surface of the base that is less than half of an overall height of the fastener element above the upper surface of the base.

10. The touch fastener of claim 1, wherein the distal edge is a non-reentrant distal tip.

11. The touch fastener of claim 1, wherein an innermost extent of the boundary surface and a forward-most portion of the distal edge form a line extending at between about 20 and 40 degrees to the base.

12. A touch fastener comprising:
    a base; and
    an array of discrete fastener elements each extending from the base and together forming with the base a contiguous mass of resin;
    wherein each of the fastener elements comprises:
        a stem rising from the base; and
        a head overhanging the base from a front side of the stem to a distal edge, the front side of the stem, an underside of the head and an upper surface of the base together forming, in side profile, a retention space boundary surface;
    wherein each fastener element has a ratio of peel thickness, measured along a line 45 degrees to the upper surface of the base and normal to the boundary surface at a point of intersection with the boundary surface, to an elevation of the point of intersection measured from the upper surface of the base, that is greater than 0.75.

13. The touch fastener of claim 12, wherein the boundary surface is generally curved.

14. The touch fastener of claim 12, wherein the boundary surface forms, at its innermost extent, a retention cavity defined between curvature discontinuities spaced from both the base and the distal edge.

15. The touch fastener of claim 12, wherein the elevation of the point of intersection is about half of an overall height of the fastener element above the upper surface of the base.

16. The touch fastener of claim 12, wherein each of the fastener elements has at least one flat side.

17. The touch fastener of claim 12, wherein the head is a generally flat, circular head having a circumference defined by the distal edge.

18. The touch fastener of claim 12, wherein an innermost extent of the boundary surface is disposed at an elevation above the upper surface of the base that is less than half of an overall height of the fastener element above the upper surface of the base.

19. The touch fastener of claim 12, wherein the distal edge is a non-reentrant distal tip.

20. The touch fastener of claim 12, wherein an innermost extent of the boundary surface and a forward-most portion of the distal edge form a line extending at between about 20 and 40 degrees to the base.

* * * * *